3,316,098
CHEESE MADE BY THE HIGH TEMPERATURE
TREATMENT OF MILK
Peter P. Noznick and Robert H. Bundus, Chicago, Ill., assignors to Beatrice Foods Co., Chicago, Ill., a corporation of Delaware
No Drawing. Filed Mar. 15, 1963, Ser. No. 265,363
26 Claims. (Cl. 99—116)

This application is a continuation-in-part of application Serial No. 796,245, filed March 2, 1959 and now abandoned; application Serial No. 825,873, filed July 9, 1959 and now abandoned; application Serial No. 167,967, filed January 22, 1962, now abandoned, and application Serial No. 176,452, filed February 28, 1962, and now abandoned.

This invention relates to an improved cheese, preferably cottage cheese or Cheddar cheese and its method of manufacture.

It is an object of the present invention to prepare a novel cheese.

Another object is to prepare cheese having an improved flavor.

A further object is to provide a process which will give an increased yield of high quality cottage cheese or Cheddar cheese for any given quantity of milk over present commercial processes.

Still further objects and entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

The cheese of the present invention is substantially free of organisms which would act to reduce its keeping qualities and will remain palatable with or without refrigeration for longer periods of time than is true with conventional cottage cheese or Cheddar cheese. In addition, the process of the invention makes a sterile product having substantially improved keeping qualities.

The methd of preparation, it has been discovered, not only improves the product but results in an appreciably increased yield. In the case of Cheddar cheese, there is also maintained, in addition to the desired quality, the cured cheese characteristics.

We find that with milk having a W–P–N (whey-protein value of 1 to 3 milligrams per cubic centimeter of nitrogen) of milk, notably 2 milligrams per cubic centimeter of milk, we obtain a cheese with a higher yield of cheese per pound of solids. This increase of pounds of curd per pound of solids amounts to at least 1.5 to 3.0 pounds, e.g., 1.8, 2.3, 2.5 and better subject to the total protein composition of milk, i.e., the higher the protein the higher the yield. In brief, there is a substantial increase in the pounds of and per pound of solids, e.g., a mean increase of 10% up to as high as 20% increase of yield over the same milk using conventional process; stated another way, the increase is consistent with 12% as the mean between a low of 10% and a high of 14% increase in yield in curd. We obtain yields which are higher than the usual casein coagulated in the milk.

By high heat treatment is meant, for example, heating at temperatures and/or hold times substantially above conventionally accepted pasteurization methods, i.e., 161° F. for 15 seconds or 145° F. for 30 minutes. By substantially above, we mean a temperature of 185° F. for a hold time of at least 900 seconds or 300° F. or 305° F. and a hold time of 1 second or less, e.g. substantially instantaneous. As examples of temperatures substantially above coventional pasteurization methods, there are included 255° F. with a holding of 15 seconds; 225° F. with holding of 100 seconds; 262° F. with holding of 100 seconds or for 12 seconds; 280° F. with holding of 10 seconds; 300° F. with holding of one second or 305° F. and holding for 0.7 second, etc. Such heat-treatment step, it will be noted, is to be distinguished from conventional pasteurization. Thus, where normal yields from 9% total solids skim milk are about 12 to 13 pounds of curd per 100 pounds of skim milk at a curd total solids content of 20%, our yields are 16 to 18 pounds and even higher per 100 pounds of skim milk at a curd total solids content of 20%. This is quite a marked increase in yield with consequent enhanced economic results and is obtained by our initial step of heat treating the liquid skim milk under suitable temperatures and hold times, the lower the temperature used, the longer the hold time which will be employed, and vice versa.

Neufchatel cheese, Colby cheese, Port-du-Salut cheese, American cheese, Swiss cheese, Brick cheese, Munster, Edam, Gouds, Gorganzola, Limburger, Monterey, Parmesan, Reggiano, Cacco-carallo, Sicilano, Romano, Feta, Bel Paese, Camembert, Brie, and Cream cheese can be made by substantially the method of this invention using such high temperature treated milk or skim milk or mixtures thereof.

The curd resulting from any of the several methods to be recited in the subsequent examples has a high water holding capacity, i.e., keeps moist. This is advantageous in that we are able to spray dry the curd and use the dried powder as a filler in food products because of its high water binding quality. We spray dry the curd with or without the whey, using spray drying with the whey when an acid product is desired. The spray dried powders find ready use in making cheese cake, fillers for sausages, etc.

As is well known in making Cheddar cheese, the initial bacteriological culture may be *Streptococcus lactics* or *cremoris* or mixtures of the same with rennet for coagulation of the curd. The purpose of such culture is to reduce the pH of the milk to optimum growth conditions for *Lactobacillus casei* which is the primary curing organism in the aging of Cheddar cheese. Enzymes also play an important role in the curing of the cheese.

The time and temperature used to process milk for Cheddar cheese according to the invention is high enough to obtain maximum yield and replace the essential organisms and enzymes destroyed after heat treatment by another source, i.e., Cheddar cheese whey.

In view of the numerous cheeses which are made by this invention, as stated above, the invention is being described and illustrated in connection with cottage cheese in Examples 1–7 and with Cheddar cheese in Examples 8–12.

*Example 1.—Cottage cheese*

Raw sweet skim milk in the normal range of total solids content of about 8.5% is heated up to 262° F. and is subjected to this temperature of 262° F. for 100 seconds to heat the skim milk. Cheese thereafter made from this liquid skim milk has many advantages, both product wise and method wise. Apparently, the heating alters the whey proteins so that they remain in the curd and are not lost in the whey. Thereby we obtain a greater yield of curd from the skim milk than normally. The preparation of the cottage cheese thereafter follows conventional procedure.

*Examples 1a, 1b, 1c, 1d, 1e, 1f, 1g*

The process we followed as in Example 1 respectively heating up to 275° F. and holding for 100 seconds, heating up to 275° F. and holding for 15 seconds and in fact heating up to 275° F. and holding for 15 to 100 seconds, and heating up to 265° F. and holding for 60 secnds, heating to 185° F. and holding for 900 seconds, heating up to 255° F. and holding for 15 seconds, heating up to 300° F. and holding for 1 second.

In Example 1 and Examples 1a to 1g, the pH of the curd is between 4.3 to 5.1, usually 4.7 to 5.1.

Holding times of 1 second to 900 seconds and temperature of 185° F. to 305° F. are used, the time and temperature relationship being indirectly proportional as indicated above.

Temperatures above pasteurization temperatures give better cheese, with higher curd tension and a firmer curd at a higher pH.

*Example 2*

Instead of heating up to and holding at 262° F. for 100 seconds, we heat treated, as in Example 1, in another example skim milk having about 9% total solids up to 280° F. and held there for 10 seconds and proceeded to make cottage cheese by accepted practice.

*Example 3*

In this further example, we heated up to and held 300° F. for one second skim milk having a total solids content of about 8.75%. The treatment was otherwise as in Examples 1 and 2.

Also, we used other temperatures and holding times than recited in Examples 1, 2 and 3 to give a heat treatment of the liquid skim milk as distinguished from mere conventional pasteurization which latter did not yield our improved results.

*Example 4*

This example was similar to Example 1 except that the skim milk was heated to 255° F. and held for 15 seconds at that temperature.

*Example 4a*

This example was similar to Example 1 except that the skim milk was heated to 255° F. and held 4 seconds at this temperature. The curd tension measured 54,000 centipoises with milk having a whey-protein-nitrogen value of 3.8 milligrams per cc., as compared with conventional milk pasteurized at 165° F. for 15 seconds which showed a curd tension of 24,250 centipoises with milk having a whey-protein-nitrogen value of 7.4 milligrams. The foregoing shows that an increase of temperature gives a better curd tension.

*Example 5*

This example was the same as Example 1 except that the skim milk was heated to 225° F. for 100 seconds.

These examples were otherwise like Examples 1, 2, and 3.

Instead of using flash cooling, a conventional tubular heat exchanger was used successfully in some examples to effect the cooling.

The cooling in Examples 1, 1a, 1b, 1c, 1d, 1e, 1f, 1g, 2, 3, 4, 4a and 5 was successfully carried out at temperatures within the range of 72° F. to 90° F.

To a separate portion of each of the cooled heat treated skim milk products of the above-identified examples, there was added about 10% by weight of a pure culture of lactic acid producing organism, namely a *Streptococcus lactis* culture. (Alternatively, there can be used *Streptococcus cremoris*.) Similarly to other separate portions of each of the cooled heat treated skim milk products of the above-identified Examples 1, 1a through 1g, 2, 3, 4, 4a and 5, there was added about 4% by weight of *Streptococcus lactis* culture.

The amount of added culture was decreased with reduction in temperature of the heat treated cooled milk and increase in culturing time.

The inoculated mixtures were allowed to incubate, as indicated, in one group of examples at 90° F. and in the other group of examples at 72° F. until the curd formed was firm enough to cut. The curd from the high heat treated milk is successfully cut at significantly higher pH's than conventionally pasteurized milk. Conventionally pasteurized skim milk just coagulates at pH 4.6 to 4.7. Whereas the same milk as high heat treated milk as in this invention coagulates consistently and readily at pH 4.7 to 5.0 resulting in better curd tension and we get a firmer curd. If we were to ripen the high treated milk at pH 4.5 to 4.6 as usual conventionally, the resultant cooking qualities are impaired. Therefore, we prefer to use a higher cutting pH range achieved in shorter times as much as 1 hour less time than conventional acidity development or curd manufacture.

The curd at 90° F. set in about 4 hours and that at 72° F. in about 14 hours. The higher the temperature, the more rapid the setting occurred.

The curd had a pH of between about 4.3 to 5.1 varying with the milks from different sources in the examples treated, this being the outside of low and high pH's successfully produced and used by us.

This curd after cutting and at a pH of about 4.3 to 5.1 as true of the particular run is now cooked. For instance, each of the products of the 72° F. culturing and the 90° F. culturing were cooked for 1½ hours at 130° F. In other experiments, each of the products of the 72° F. culturing and the 90° F. culturing were cooked at 160° F. for 2½ hours. Other samples of the cultured curds were cooked at intermediate temperatures of this range, i.e. about 130° to 160° F. for 1 to 3 hours. The longer cooking times and high temperatures are used where more moisture must be removed, and, in each case, to obtain a higher solids content. That is, we preferably cooked to sufficient temperature and for a long enough time to yield a curd containing about 20% total solids, the minimum for a curd when making uncreamed cottage cheese.

On the other hand, in making a creamed cheese where we cooked to an 18% solids curd, the added cream brought the solids content up to about 20% total solids. In some cases, the skim milk by reason of its source and make-up will only produce such an 18% solids content which will be increased by the added cream.

Alternately, in the examples mentioned above, we have also cooked to about 20% total solids and added as much as desired of a lower solids cream, e.g. one containing 12% butter fat, to give an increased solids content above the minimum, i.e. 20% solids.

At this point, it is important to describe that our observations have indicated that by using an adequate cooking time range, for example, of 1 to 3 hours, at a high cooking temperature of, for instance, about 130° to 160° F. with a low acidity of approximately pH 4.3 to 5.1, an important result is obtained. That is, all organisms introduced to the product with the said culture inoculum (*S. lactis* or *cremoris*) are destroyed, thereby producing the desired curd.

*Variegated cottage cheese*

To any one of the described heat treated milks, we add butter fat as butter oil to which has been added fat soluble and/or miscible vegetable colors, e.g., yellow, red, green, etc. which are commercially available and homogenize the colored fat and skim milk and make as described. Preferably, the butter or butter oil is pasteurized or sterilized first to preclude contamination.

This results in a curd with a stable non-leaching color which can be mixed with white curd to form variegated cottage cheese or sold as colored cottage cheese. This product is attractive for consumer use for Christmas salads, etc.

*Buttermilk flavored cottage cheese powder*

We heat treat the milk, culture the same, and cook the cultured milk as described above.

Then we disperse the curd mechanically in a mixer and spray dry with the whey. This results in a water dispersible stable powder high in water holding characteristics and containing desirable cultured buttermilk characteristics. Such powder is used in buttermilk pancake mixes and other preparations requiring a buttermilk flavor.

*Example 6*

Alternatively or additional to the foregoing methods of preparing plain and creamed cottage cheese, we have successfully used the procedures recited in this example.

We add to the skim milk before heat treatment small amounts, e.g. 0.1 to 0.2% by weight disodium phosphate, tetrasodium pyrophosphate or sodium tripolyphosphate. All have proven satisfactory in modifying heated skim milks to result in a firm curd.

These salts are preferably added before heat treatment of the skim milk to reduce contamination and in any case before the culturing and cooking steps.

In a specific example, 0.2% of disodium phosphate was added to raw sweet skim milk having about 8.5% solids and the mixture heated at 262° F. for 100 seconds and the procedure of Example 1 then followed.

The skim milk to which the said salts are added before heat treatment are in some cases improved in gel strength with resultant enhanced curd strength by post heat treatment homogenization, i.e. the heat treated milk is homogenized, the milk having a temperature of 90° F. to 180° F.

Thus, we heat treated the skim milk, including .2% tetrasodium pyrophosphate, for example, at 262° F. for 100 seconds, and the curd gel strength is improved by post homogenization at 8000 pounds p.s.i. at 100° F. This homogenization range is between about 5 to 10,000 p.s.i. and the temperature range is between 90°F. and 180° F. as stated.

When salts are added after sterilization, i.e. before culturing and cooking, the protein coagulates at a higher pH of about 5.0 to 5.1 and in a shorter time. This allows the cottage cheese to be made with less time required for incubation of the inoculated product. Hence, the step is useful where shorter incubation times are required or a sweeter whey, i.e. higher pH such as pH 5.1 is desired. By heat treating the milk, for example, at 262° F. for 100 seconds by way of example, and then adding about 0.2% tetrasodium pyrophosphate after such heating, followed by culturing and cooking as described, a firm curd resulted in about 3 hours having a pH of about 5.08. Normally, without the salt addition, this would have required 4 hours, and the pH of the curd would be about 4.7 We found the addition of the pyrophosphate or other salt advantageous in producing a sweeter, i.e. less acid curd but we prefer to add the salt before heating so as to reduce the possibility of contamination. Post homogenization as described will improve the curd in some cases, as above described, the milk being heated to 90° to 180° F. for this step.

Rennet in relatively small amount, generally, about one-half of the usual amount, i.e. ½ oz. per 1000 pounds of skim milk may be employed in the usual manner or preferably with the lactic acid starter, e.g. *S. lactis*, in the conventional manner. A very firm curd results and the presence of the rennet is used to control the firmness of the curd or shorten the coagulation time. In place of enzymes such as rennet, bromelin, pepsin or trypsin may be used alone but preferably in the amount stated, with the lactic acid-producing organism or starter (*S. lactis*).

Other starters than *S. lactis* described above may be used alone or with rennet, as is well known in the cheese industry. Preferably, a standard inoculum is used which is pure and uncontaminated. Such a starter is prepared from truly sterilized skim milk subsequently inoculated with a pure uncontaminated *Streptococus lactis* or conventional organism. As will be appreciated, any organisms remaining in the product after incubation are destroyed in the cooking, referred to above, which is carried out within the temperature range of 130° to 160° F. and for 1 to 3 hours.

*Example 7*

The heat treated skim milk used in making cottage cheese in accordance with this invention may be prepared by sterilizing the skim milk, using a temperature by heating up to 280° F. and holding for 10 seconds as described above, evaporating it to 30% total milk solids non fat, and subsequently storing the sterile concentrate until desired at normal temperatures. When it is required to use such sterile concentrate, it is reconstituted with sterile water and employed in making cottage cheese in accordance with this invention. In this example, where the product is stored at low temperature, e.g. 35° F. sterilizing conditions are unnecessary and lower temperatures, namely heating to 255° F. and holding for 15 seconds is used for the heat treatment.

If it is not desired to use a sterile liquid concentrate, the sterile concentrate may be spray dried and stored under sterile conditions until required, whereupon the powder is reconstituted with sterile water to provide a sterile skim milk useful for making cottage cheese according to this invention.

Following the cooking step described above at which time any organisms remaining in the curd are destroyed, the whey is subjected to the usual draining. That is,, in each of the aforesaid examples, this is done by simply opening the valve in the vat containing the curd and whey at its cooking temperature and straining the fluid pass through a simple strainer by gravity. We prefer to drain the whey containing the suspended curd by passing the same to a sterile basket type centrifuge which removes the whey mechanically and rapidly.

The hot drained curd is cooled and rinsed preferably with sterile cold water at 35° F. The cooling water was also successfully used at temperatures of 40° F., 50° F., 60° F. and up to 70° F. and the rinsing and cooling was repeated in some instances but usually one rinse with the cool sterile water was adequate. Where the basket centrifuge was used, the hot curd was similarly cooled as described. We also successfully used counter current cooling and washing with the sterile cold water and recentrifuging where desired although one rinsing and cooling was usually adequate. The curd was cooled to the temperatures above set forth, namely 35° F. to 70° F. and was now drained in the usual manner of free water. It was then ready for packaging or for creaming where a creamed cottage cheese was the end product desired.

*Example 8*

Thirty-two gallons of whole milk testing 3.5% butterfat was heated at 255° F. for 15 seconds. The milk was tube cooled in a heat exchanger to 92° F. for optimum growth of the organisms and 0.1% calcium chloride, 0.5% *Streptococcus lactis* culture, cheese color at the rate of 2 ounces per 1000 pounds of milk and rennet at the rate of 3 ounces per 1000 pounds of milk and 2% normal Cheddar cheese whey at 70° F. from a batch of Cheddar cheese made by usual time and temperature treatment of the raw milk of 165° F. for 15 seconds, were added and stirred into the milk. The increase in acidity was observed to be much faster in this milk than in the heat treated conventional control milk. After development of the body at pH 6.02, the curd was cut, cooked to 106° F. for about ½ hour (we found that above 110° F. desirable organisms were destroyed), drained, cheddared, cubed, salted and pressed into wheels. The foregoing are conditions which will maintain the *Streptococcus lactis* culture through cheddaring and thereafter provide optimum growth conditions for the other cheese curing bacteria.

The control cheese yield was 9.45 pounds of cheese per 100 pounds of milk, whereas cheese made by the foregoing example yielded 10.9 pounds of cheese per 100 pounds of the same milk. The control product was not prepared by initially heating the milk for the time and temperature described above or adding the whey as in the above example. This showed that the initial time and temperature treatment of the milk and the whey addition are critical factors.

While the pH does not appear critical, it was evident that coagulation of the curd was obtained at a higher pH than by conventional processes, e.g. as evidenced by observation and comparison of the example and control sample.

Example 8a

This example is similar to Example 8 except that no calcium chloride was employed, while 2.0% of the *Streptococcus lactis* culture was used and 10% normal cheddar cheese whey was employed at a temperature of 100° F. instead of 2% at 70° F. After development of the body at pH 5.57, the curd was cut and cooked to 100° F. for about ½ hour.

Example 9

In this example, Example 8 was followed except that about 2% of Cheddar cheese whey by volume at 90° F. from a batch of cheese made by conventional time and temperature treatment of the raw milk of 165° F. for 15 seconds was added to the heated milk to inoculate the same and provide the organisms and enzymes necessary for proper curing, the amount of calcium chloride was 0.2% and the milk was initially heated at 262° F. for 100 seconds.

Example 10

This example was the same as Examples 8 and 9 except the initial heat treatment was 280° F. for 10 seconds.

Example 11

This example was the same as Examples 8 and 9 except that about 2% pasteurized skim milk was added to Example 8 instead of the whey to speed up the curing process as in Examples 8, 9 and 10.

Example 12

This was the same as Example 11, except that 2% pasteurized normal milk was added instead of whey or skim milk.

In Examples 8, 9 and 10, 2 to 12% Cheddar cheese whey by volume has been found successful. The temperature of the whey is not believed critical at time of addition, but is preferably between 85° F. and 100° F., although it may be at room temperature upward to above 100° F. The temperature of the heat treated milk at the time of addition of the organisms and enzymes must be below the thermal destruction point of the desired organisms and enzymes so added. This temperature, of course, will necessarily vary with different organisms and enzymes.

Following Examples 8, 9 and 10, we have used satisfactorily 5% whey as well as 2% and 12% by volume.

Where skim milk or normal milk are used, 2 to 12% by volume are useful but in the case of skim milk, the resultant fat content of the mixture must result in cheese meeting legal requirements of the State and Federal Government. Thus, in some cases, the milk used in making the cheese may have to contain a higher fat content.

In Examples 8, 9, 10, 11 and 12, the increase in Cheddar cheese yield over conventional processes was about 4 pounds per 100 pounds of milk. In fact, a 30,000 pound batch of milk gave 1200 pounds more cheese than by conventional cheese manufacture.

The protein in the cheese derived from whey protein and casein is identified by analytical study of sulfur to nitrogen ratio in the milk. The lact-alubumin fraction of milk contains a higher fraction of sulfur bearing amino acids, also phosphorus to nitrogen. The phosphorus is in the casein and the lact-albumin contains none. Hence, the ratio is less. The increase in the curd is denoted by the increase by the whey-protein in the curd. Cottage cheese having a protein composition such that about 20% of the protein is whey-protein distinguished from conventional cottage cheese which only contains whey-protein to a limited extent as may be included in the whey or liquid fraction but never over 5% at best. This is important in that it indicates a high yield, i.e. extracting more protein from any given milk and utilizing it in the cheese as distinguished from its being lost if used as feed.

In conventional cheese whey-protein which is colloidal material is lost in the liquid whey as a colloidal suspension during draining and washing. That is, whey-protein is retained in intimate contact with a casein and the phenomenon is not understood but appears to be and is believed to be coprecipitate with casein, i.e. we get the lact-albumin fraction precipitated as well since both are insoluble in the whey liquid. It has been found that 70% or more of the whey-protein nitrogen, e.g. 75%, 80% or 85% of the whey-protein nitrogen goes into the cottage cheese having a curd with a high percentage of lact-alumin. When the casein remains constant and the whey-protein increases, the percent increase in yield of cottage cheese increases. When the casein increases, however, we get a lower increase in yield. That is to say in normal milk when the ratio of casein to whey-protein is high, e.g. 2½% to 5% to whey-protein ½% to 1% is high the increase in yield is low. When the ratio is low the yield is high. In brief, the percent increase in yield will vary as the ratio of casein to whey-protein varies. Thus, as the percent of whey-protein increases the yield also increases because of the inclusion of the whey-protein in the cheese. The percent increase in yield between conventional process milk and our high heat process of this invention will be greater as the ratio of casein to whey-protein is lower. As stated, it is desirable to have the whey-protein nitrogen ratio low, e.g. 1 to 3 milligrams, preferably, plus or minus 1 gives the maximum yield of cottage cheese or cheese of any type.

As stated herein, the high heat treatment may consist in heating the milk up to 185° F. and holding for 900 seconds, heating up to 195° F. and holding for 200 seconds, and heating up to 225° F. and holding for 100 seconds at the temperatures recited. We have also successfully heated the milk to 262° F. and held at that temperature for 100 seconds. We have heated up to 255° F. and held for 4 seconds, to 305° F. and held for 0.7 second. The curd coagulates, as explained above, at a pH between 4.3 and 5.1 and preferably 4.8 to 5.1. The increase in whey-protein content increases the gel strength of the curd and a cheese made from high heat treated milk, i.e. heated up to 255° F. temperature and held for 15 seconds time such that the skim milk so heat treated fails in a curd tension range suitable for curd cutting.

In all cases, there is an increase in yield which is measured in pounds of curd, as high as 20% per pounds of solids.

As indicated, there has also been produced a cottage or Cheddar cheese in which the lact-albumin is complexed with the casein and appears as casein. When the cheese containing the complex containing the lact-albumin was analyzed, in no case was the ratio of casein-protein to casein-nitrogen greater than 0.051.

In the case of sulfur, which is present in the lact-albumin with the casein the ratio of sulfur in cottage or Cheddar cheese to protein nitrogen is about 0.05 in contrast to a much lower ratio of conventional cottage or Cheddar cheese.

The difference in product between preparing Cheddar cheese by conventional heating and the high heat treatment of the present invention is illustrated in the following table.

|  | Conventional Low Heat Control 161° F. for 15 seconds Sample No. 1 | High Heat 255° F. for 15 seconds Sample No. 2 |
|---|---|---|
| Casein | 18.7 | 18.6 |
| Total phosphorus (percent) | 0.162 | 0.127 |
| Total sulfur (percent) | 0.110 | 0.156 |
| Ratios: |  |  |
| P/N | 0.0553 | 0.0435 |
| S/N | 0.0375 | 0.0535 |

As previously set forth, the initial time and temperature conditions in the milk in the foregoing examples is desirably such that the whey protein nitrogen content is reduced to a minimum to insure maximum increase in yield of cheese, the temperature is between 185° F. and 305° F. and the time between 0.7 second to 900 or 1000 seconds, time varying inversely with temperature. Within these ranges we obtain desirable and typical body characteristics of the finished cheese. The time and temperature stated in Example 8 results in about two-thirds of the total improvement in yield possible by heat treatment. The flavor, namely, the typical Cheddar cheese flavor, is produced by the organisms and enzymes which are conveniently obtained from the added normal cheese whey. Of course, similar organisms and enzymes from any other source, e.g. from Cheddar cheese whey but isolated in other forms such as lyophilized powder or paste, or isolated from normal milk or skim milk, will give the desired flavor. Variations in yield improvement also result from variations in organisms in the starter culture, i.e. certain strains possess more pronounced proteolytic properties.

The advantage in heating milks to higher temperatures is the reduction of competitive undesirable organisms in cheese making and the increase in yields of from 2 to 4 pounds of cheese per 100 pounds of milk.

While we have mentioned whole milk of varying fat content to meet State or Federal legal requirements for cheese, in the examples, any of the usual milk or mixtures employed for making Cheddar cheese are useful in accordance with our discovery.

The procedures of Examples 1 to 12 can be followed for any cheese where the necessary organisms and enzymes must come from original raw or pasteurized milk and the step of introducing the organisms and enzymes does not, as with the present procedure for making Cheddar cheese, interfere with the conventional or customary steps of cheese making associated with any particular type of cheese.

The added organisms and enzymes are similar to those present in the original milk which had been destroyed or substantially reduced by the heating of the milk for the purpose of increasing the cheese yield. They are necessary for the proper curing, i.e. development of the characteristic and desired flavor typical of the cheese being made.

The added whey in Examples 8 to 10 is that obtained by making Cheddar cheese in the normal way, using conventional times and temperatures of 163° F. for 15 seconds to 180° F. for 15 seconds.

In the case of Cheddar cheese, about 50 of the total solids in the cheese must be butterfat and this varies with the different types of cheese. Thus, the reference to milk having 3.5 butterfat is not critical in that any desired butterfat content may be used above minimum legal requirements.

It has been found that the product of the present invention, e.g. the cottage cheese or the Cheddar cheese has a greater rate of digestibility than conventionally prepared cottage cheese or Cheddar cheese; that the present product contains more sulfur containing amino acids, and a whey protein to casein ratio substantially the same as that in the original milk and hence more nearly approaching human milk. The products are also more stable than conventional cottage cheese and Cheddar cheese.

Thus, original milk contains 2.5% casein and 0.5% whey protein. The cottage cheese or Cheddar cheese made by the present process contains substantially all the casein, i.e. the 2.5% and almost all of the whey protein, e.g. 0.4 to 0.45% (which is 80 to 90% of the original 0.5% in the starting milk).

Starting milks normally range in casein content from 2.2 to 2.8% and in whey content from 0.45 to 0.55%.

Unless otherwise indicated all parts and percentages are by weight.

We claim:

1. The process of making cheese comprising heating the milk at a temperature and for a time between about 185° F. for 1000 seconds to 305° F. for 0.7 second to obtain maximum yields while maintaining desirable body and flavor and thereafter culturing the milk to a pH of 4.3 to 5.1.

2. The process according to claim 1 comprising supplying Lactobacillus casei and enzymes by introducing to the previously heated milk 2 to 12% by volume of whey containing the same.

3. The process according to claim 1 comprising supplying Lactobacillus casei and enzymes by introducing to the previously heated milk 2 to 12% by volume of a milk containing the same.

4. The process according to claim 1 comprising supplying Lactobacillus casei and enzymes by introducing to the previously heated milk 2% by volume of whey containing the same.

5. The process according to claim 1 comprising supplying Lactobacillus casei and enzymes by introducing to the previously heated milk 5% by volume of whey containing the same.

6. The process according to claim 1 comprising supplying Lactobacillus casei and enzymes by introducing to the previously heated milk 12% by volume of whey containing the same.

7. The process according to claim 1 comprising supplying Lactobacillus casei and enzymes by introducing to the previously heated milk whey from a previous cheese making process containing the same.

8. The process according to claim 1 comprising supplying Lactobacillus casei and enzymes by introducing to the previously heated milk whey from a previous cheese making process wherein the milk had been heated at 163° F. for 15 seconds to 180° F. for 15 seconds, and containing such enzymes and organisms.

9. The process according to claim 3 comprising supplying Lactobacillus casei and enzymes by introducing to the previously heated milk 2 to 12% by volume of skim milk containing the same.

10. The process according to claim 3 comprising supplying Lactobacillus casei and enzymes by introducing to the previously heated milk 2 to 12% by volume of normal whole milk containing the same.

11. A process according to claim 1 wherein the milk is skim milk.

12. A process for making cottage cheese comprising heating skim milk to a time and temperature range between 185° F. with holding for 900 seconds and 300° F. with holding for one second, culturing the said heat treated skim milk to a pH of 4.8 to 5.1, cooking the cultured skim milk at a temperature and for a period of time to destroy any remaining culture organism, draining the whey, and rinsing the curd with water.

13. A process according to claim 12 wherein the cooking treatment is for 1 to 3 hours at 130 to 160° F.

14. A process according to claim 12 wherein sterile cream is added to the rinsed curd.

15. A process according to claim 12 wherein there is added to the milk a sterile fat containing color which is imparted to the final cheese product.

16. A process for making cottage cheese powder comprising culturing to a pH of 4.8 to 5.1 skim milk which has been heat treated between a temperature of 185° F.

nd holding time of 900 seconds and a temperature of 00° F. and holding time of 1 second, cooking the cultured skim milk at a time and temperature to destroy any remaining culture organism, dispersing the curd containing retained whey and spray drying the whey-curd mixture to produce a powder having a buttermilk flavor.

17. A process according to claim 12 wherein there is added to the milk before culturing and cooking a small amount of a compound selected from the group consisting of disodium phosphate, tetrasodium pyrophosphate and sodium tripolyphosphate.

18. A process according to claim 17 wherein the compound is added before the heat treating.

19. A process according to claim 12 wherein the culuring organism is *Streptococcus lactis*.

20. A cheese prepared by the process of claim 1 in which the ratio of casein protein to casein nitrogen is not greater than 0.051 and wherein the ratio of sulfur to protein nitrogen is at least 0.05.

21. Cheese according to claim 20 which is Cheddar cheese.

22. Cheese according to claim 20 which is cottage cheese.

23. A process for the manufacture of cottage cheese which comprises the steps of subjecting the milk to a high temperature treatment ranging from a temperature of 185° F. and a holding time of 900 seconds to a temperature of 300° F. and a holding time of 1 second, setting the milk to form cottage cheese curd and whey, said setting being continued until a cutting acid is developed in the range of between a pH of 4.8 and 5.1, cutting the curd and cooking the curd, draining the whey from the curd and washing the curd.

24. A process according to claim 23 wherein the high temperature treatment is between 262° F. for 100 seconds and 300° F. for 1 second and the pH of the cutting acid is between 5.0 and 5.1.

25. A process according to claim 1 wherein the milk contains cream and the product is cream cheese.

26. A process for the manufacture of cottage cheese which comprises the steps of subjecting the milk to a high temperature treatment ranging from a temperature of 255° F. and a holding time of 15 seconds to a temperature of 300° F. and a holding time of one second, setting the milk to form cottage cheese curd and whey, said setting being continued until a cutting acid is developed in the range of between a pH of 4.8 and 5.1, cutting the curd and cooking the curd, draining the whey from the curd and washing the curd.

References Cited by the Examiner

UNITED STATES PATENTS

| | | | |
|---|---|---|---|
| 482,897 | 9/1892 | Frederiksen | 99—116 |
| 1,578,820 | 3/1926 | Gere | 99—116 |
| 2,326,133 | 8/1943 | Fear | 99—116 |
| 2,564,374 | 8/1951 | Roland | 99—116 |
| 3,017,274 | 1/1962 | Dahlstrom | 99—115 |
| 3,075,842 | 1/1963 | Shaver | 99—116 |

A. LOUIS MONACELL, *Primary Examiner.*

D. M. STEPHENS, *Examiner.*